April 19, 1932.  J. A. GANSTER  1,854,897
METHOD OF MAKING BEARING RINGS
Filed Dec. 26, 1929
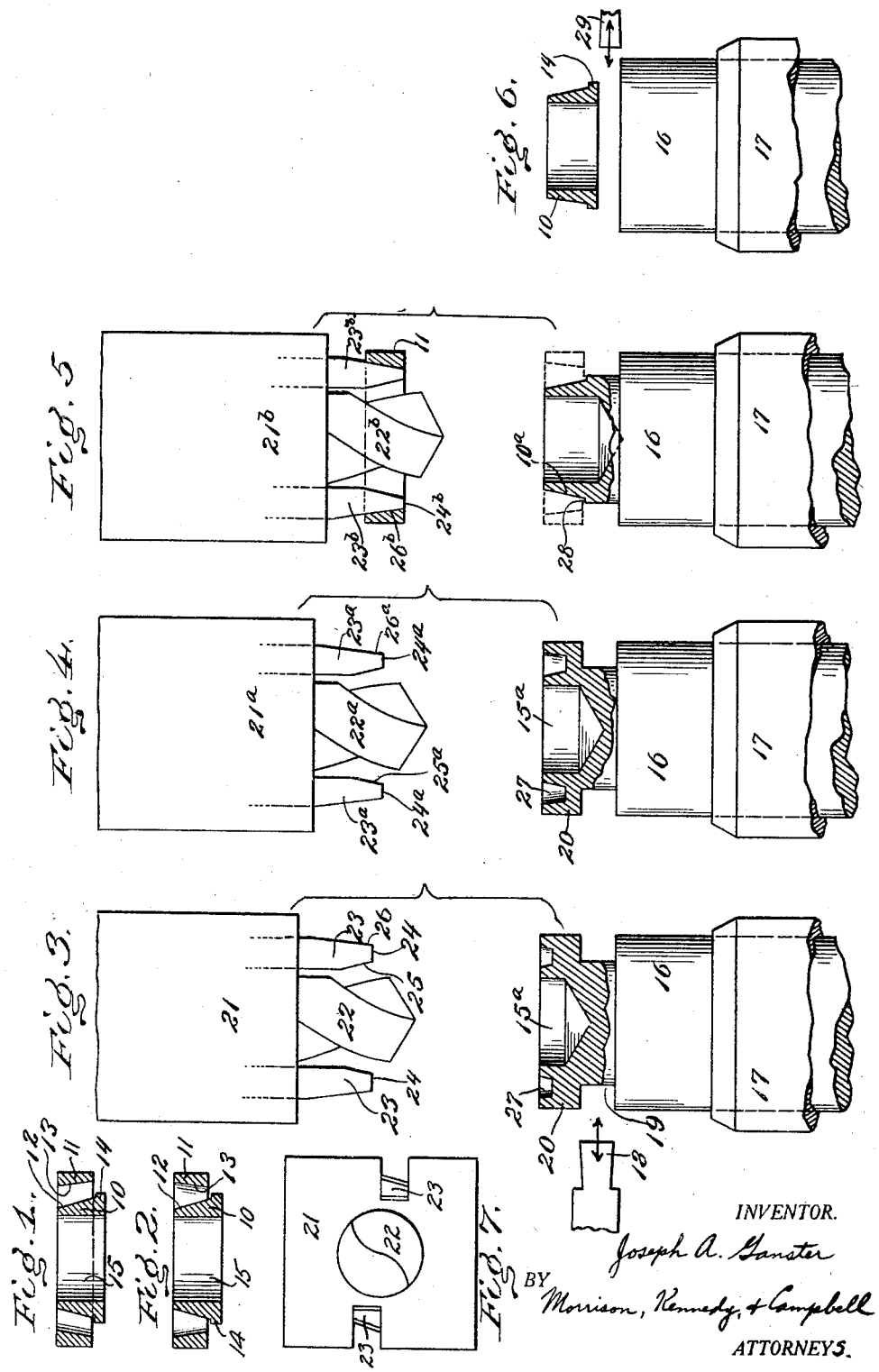
INVENTOR.
Joseph A. Ganster
BY Morrison, Kennedy, & Campbell
ATTORNEYS.

Patented Apr. 19, 1932

1,854,897

UNITED STATES PATENT OFFICE

JOSEPH A. GANSTER, OF PHILADELPHIA, PENNSYLVANIA

METHOD OF MAKING BEARING RINGS

Application filed December 26, 1929. Serial No. 416,471.

This invention relates to a method of producing rings, and refers particularly to a novel method of producing rings which are used as inner and outer races of anti-friction roller bearings.

In bearings of the type to the manufacture of which this invention is particularly adapted, the inner periphery of the outer race and the outer periphery of the inner race are tapered or beveled in the same general direction, for the reception between them of a plurality of rollers which may themselves be slightly beveled or cylindrical, as desired. According to one prior art method of manufacture, these two rings or races are cut from a single piece of metal, in the same relationship to each other as that in which they are subsequently assembled for use. The arrangement is such, however, that there is very little clearance for the cutting tool and for the chips, and other complications arise due to the fact that the cutting tool cannot be given a straight line movement in a direction parallel to the common axes of the rings.

According to the present invention, the ring are cut simultaneously in a relatively reversed endwise relation, resulting in great simplication of the manufacturing steps, with greater accuracy and uniformity in the product, and at lower cost.

With the foregoing and other advantages and objects in view, the invention consists in the novel method set forth in the following description, shown by way of illustration in the accompanying drawings, and specifically pointed out in the appended claims.

In the drawings attached hereto,

Figure 1 is a transverse sectional view through the inner and outer races of an anti-friction bearing of one type to be produced by the present invention;

Fig. 2 is a similar view of the bearing races in the relation in which they are produced, the outer race being reversed endwise from the position in which it is ultimately assembled with the inner race for actual use;

Fig. 3 is a fragmentary diagrammatic view, partly in cross section, illustrating the first step in the method of producing the rings of Figs. 1 and 2;

Fig. 4 is a view similar to Fig. 3, illustrating the next step in the method;

Fig. 5 is a similar view, showing how the outer ring is separated from the inner ring stock;

Fig. 6 is another similar view, showing how the inner ring is finally severed from the bar stock from which it is produced; and Fig. 7 is a detail end view of one of the trepanning tools used in the novel method.

While the invention is not restricted to such use, it is particularly adapted for the manufacture of rings for anti-friction bearings, which as shown in Fig. 1, comprise an inner ring or race 10 and an outer ring or race 11. The inner ring 10 has a tapered outer periphery 12, and the outer ring 11 has a tapered inner periphery 13, which together constitute raceways for the reception between them of a plurality of rollers, as is well known to those skilled in the art. These tapered raceways 12 and 13 extend in the same general direction, although they need not necessarily have the same degree of taper. It is also to be noticed that the inner race 10 is thicker or longer than the outer race 11, and is provided at the end of its greater diameter with a flange 14, and it has a central bore 15 extending through it to provide for the fitting of the ring upon a shaft.

The rings 10 and 11 are assembled together for use in the relative positions shown in Fig. 1, but in accordance with the present invention they are simultaneously produced from a single piece of metal in the relationship shown in Fig. 2. In other words, as they are produced in accordance with the present invention, the end of largest diameter of the raceway 13 is at the same end of the stock as the end of smallest diameter of the raceway 12, so that the tapers of said raceways extend in opposite directions instead of in the same general direction. The advantages of this arrangement will be more apparent from the following description of the manufacturing steps.

As shown in Fig. 3, a bar 16 of steel or other suitable material is secured in a rotatable chuck 17 with one end of the bar extending sufficiently from the end of the chuck to allow of operation upon the bar by suitable tools. The chuck 17 may be that of any desired type of machine well known in the art, for example, a lathe or mill, and the spindle may be arranged either vertically or horizontally, as desired. A cutting tool 18 is moved laterally inward against one side of the bar 16 as the same rotates, forming an annular groove 19, outwardly of which is what may be termed, a flange portion 20 of a thickness equal to that desired in the outer race or ring 11. Another tool 21 is moved axially against the rotating end of the bar 16, and is provided with a central boring member 22, which operates to form the central bore $15^a$ in the end of the bar, and a pair of trepanning cutters 23, which are preferably arranged at diametrically opposite sides of the boring member 22 and spaced slightly therefrom. The tool 21 may operate upon the end of the bar 16 either at the same time as the cutter 18, or after said cutter has performed its operation. The trepanning cutters 23 are each provided with a sharp cutting end 24 and with inner and outer cutting edges 25 and 26, which are angularly formed respectively to the same degree of taper as the raceways 12 and 13, when the latter are in the relationship shown in Fig. 2. Preferably the trepanning cutters 23 do not cut so deeply as the boring member 22, although, of course, if desired, they can be designed to perform the complete operation. I prefer, however, to use a series of trepanning tools, successively, for the purpose of providing greater clearance for the chips which are cut out of the rod by said tools. Therefore, in the preferred and illustrated steps of the method, the trepanning cutters 23 act upon the end of the bar 16 to cut a circular groove 27, and the tool 21 will be controlled by a cam or other suitable mechanism, so as to limit the inward feed of the tool.

Another tool $21^a$ is then employed to further the operations commenced by the tool 21, this tool $21^a$ being of a construction similar to the tool 21, and including a central boring member $22^a$ and trepanning cutters $23^a$, as shown in Fig. 4. The ends $24^a$ of the trepanning cutters $23^a$ are adapted to cut more deeply into the bottom of the circular groove 27, and preferably said cutting ends $24^a$ are of slightly less width than the ends 24 of the tool 21, so that in this intermediate step of the method, all of the cutting will be done by the ends $24^a$ and by the adjacent portions of the tapered inner edges $25^a$.

In the next step of the method, a tool $21^b$ similar to 21 and $21^a$ is employed, it having a central boring member $22^b$ and trepanning cutters $23^b$, which are adapted to cut still more deeply into the end of the rod. The cutting ends $24^b$ of the trepanning cutters $23^b$ are narrower than those of either of the trepanning cutters 23 or $23^a$, whereas the outer sides $26^b$ of said cutters are of the same dimensions and same degree of angularity as the cutting edges 26 of the first tool. It is to be noticed that in this operation, as shown in Fig. 5, the circular groove 27 is cut entirely through the previously formed flange portion 20 and extends slightly beyond the inner side of said flange portion, so as to form a shoulder 28 upon the remaining tapered end $10^a$ of the rod 16. As the trepanning cutters $23^b$ complete their cutting action through the flange portion 20, they sever the outer ring 11 from the remainder of the stock, and as the tool $21^b$ is retracted from the end of the rotating stock, said outer ring 11 will remain upon said tool, as shown in Fig. 5.

A cutting off tool 29 is then moved laterally against the rotating stock to cut off the inner ring or race 10 at a point inwardly from the shoulder 28 previously referred to. Said cutting off tool 29 is preferably thinner or narrower than the grooving tool 18, and engages the material at the base of the groove 19 which was first formed by said tool 18, leaving the small flange 14 at the end of largest diameter of the ring member 10.

The tools 21, $21^a$ and $21^b$ may be arranged upon a slide to facilitate their successive presentation to the end of the rotating bar 16, or they may be mounted upon a turret, if that type of machine is to be employed.

From the foregoing it will be seen that the tapered raceways 12 and 13 of the respective ring members 10 and 11 may be simultaneously formed by a tool of simple construction which moves axially with reference to the rotating stock 16 and chuck 17. Furthermore, it will be evident that by cutting the outer ring member 11 in a reversed endwise relation to the inner ring member 10, greater clearance is provided for the trepanning cutters and for the metal chips which result from this operation. This greater clearance can be best appreciated by a comparison of Figs. 1 and 2, noting particularly the relative directions of the tapered raceways 12 and 13 in each of these figures. The separate ring members 10 and 11 may then be individually finished in a grinding machine or the like, as is customary, after which they can be assembled together for use in their ultimate relation, as shown in Fig. 1, in which relation the outer ring or race 11 is in a reversed endwise position with reference to that in which it was originally formed with the inner ring or race 10.

The foregoing description is illustrative of the novel steps of the method as applied to the production of successive pairs of bearing rings from bar or rod stock, which is fed forwardly in the chuck after each cutting-off operation. The invention is, however, obviously not limited in this respect to use on or with bar stock, but is also adapted, with equal advantage, to the production of bearing rings from preformed sections or pieces of material, forged or otherwise produced and each being of such size as to form a pair of rings or races.

The novel method above described, is extremely simple, and lends itself readily to industrial use, whereby to reduce the manufacturing cost of bearing rings, and at the same time to improve the product and to make possible greater uniformity and accuracy therein. The invention is of course, susceptible of numerous modifications in the various steps, and the right is herein reserved to make such changes as fall within the scope of the appended claims without departing from the spirit of the invention.

Having thus described my invention, what I claim is:—

1. The method of producing inner and outer bearing races simultaneously, which consists in providing a piece of material of suitable size, and severing the same into two concentric annular races by cutting an annular groove endwise through it, the inner and outer peripheries of said groove being tapered in opposite directions.

2. Steps in the method of producing bearing races, which consist in providing a piece of material of suitable size, presenting one end of said material to a trepanning tool, and operating upon it to sever it into two concentric annular races having their respective raceways tapered in opposite directions.

3. Steps in the method of producing bearing races, which consist in forming a substantially cylindrical piece of material with an annular flange on one end, and severing the same into two concentric races by cutting an annular groove endwise through said flange.

4. Steps in the method of producing bearing races, which consist in forming a substantially cylindrical piece of material with an annular flange on one end, and severing the same into two concentric races by cutting an annular groove endwise through said flange, said annular groove being characterized by inner and outer peripheries which are respectively tapered in opposite directions.

5. The method of producing inner and outer bearing races simultaneously, which consists in forming a flange on one end of a metal bar, operating upon said flanged end of the bar with a tool to form an annular groove through the flange and thereby to sever an outer annular member from the bar, and subsequently severing an inner annular member from the bar, the outer annular member so formed being in a reversed endwise relation to that in which it will subsequently be assembled for use with the inner annular member.

6. The method of producing bearing races, which consists in providing a cylindrical blank, and severing therefrom in concentric relation, inner and outer race rings formed with opposing angularly related faces, in a relative position reversed to that they will occupy in the assembled bearing.

In testimony whereof, this specification has been duly signed by:

JOSEPH A. GANSTER.